April 27, 1965 L. R. NESTOR 3,180,599
BRACKET
Filed Oct. 29, 1962
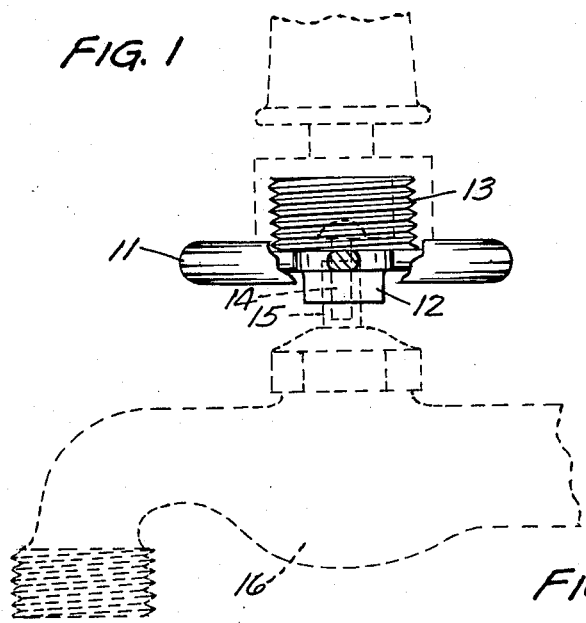
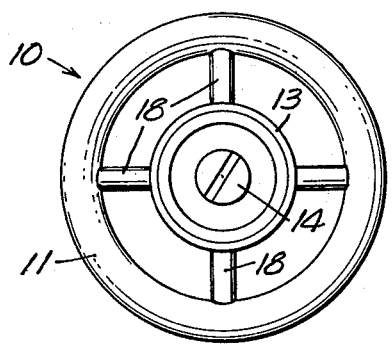
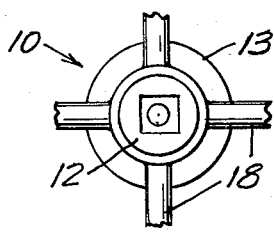
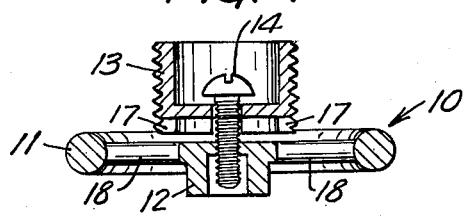
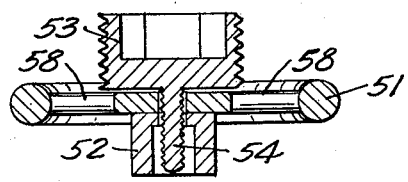
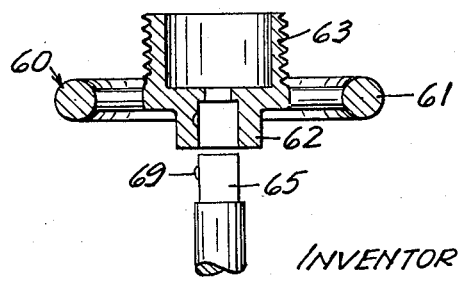
INVENTOR
LEONARD R. NESTOR
BY Gilbert B. Gehrenbeck
AGENT United States Patent Office 3,180,599
Patented Apr. 27, 1965

3,180,599
BRACKET
Leonard R. Nestor, 2139 E. Magnolia Ave.,
St. Paul, Minn.
Filed Oct. 29, 1962, Ser. No. 233,791
6 Claims. (Cl. 248—75)

This invention relates to attachments for faucets and in particular to nozzle-retaining bracket members attached to or integral with outdoor faucets or bibcocks designed for making screw-connection with flexible hose, e.g. garden hose.

Removable nozzles are commonly used with garden hose to control the stream of water for various purposes. A householder using a garden hose for such varied purposes as sprinkling the garden, watering the dog, washing the car, and cleaning the sidewalk frequently finds it desirable to remove the nozzle, or to replace it temporarily with an automatic sprinkler or long-handled brush or other implement. In due course he desires to replace the nozzle, but then frequently has difficulty in remembering where it was placed, or must make another trip to basement or garage storage area where he may have taken it for safekeeping.

The present invention offers convenient and economical temporary storage facilities for hose nozzles at easily accessible locations which will necesarily not be forgotten. In brief, the invention provides a combination faucet handle and nozzle support. Since the user must in any event turn off the flow of water before removing or replacing the nozzle, he must necessarily go to the faucet at such times and hence is at once provided with a convenient bracket on which to place or from which to retrieve the nozzle. The device keeps the nozzle from being filled with leaves or grass, and from being lost or damaged, as frequently happens when it is merely dropped on the ground. Furthermore, the device is of the utmost simplicity, and can be made either integral with the faucet handle member or for attachment thereto.

The invention will become more apparent on reference to the accompanying drawing, in which FIGURE 1 is an elevation, partly in section and partly in outline, showing a combination faucet handle and nozzle bracket attached to a conventional outdoor faucet or bibcock and carrying a hose nozzle in temporary storage position;

FIGURE 2 is a top plan view, and FIGURE 3 a partial bottom plan view, of the combination handle and bracket of FIGURE 1; and FIGURES 4–6 represent in cross-section three illustrative variations of the device.

The device 10 of FIGURES 1–3 consists of a wheel-like handle member 11 having a dependent centrally located hollow tubular socket member 12 and, extending centrally from the other side of said handle, an externally threaded bracket member 13. A screw 14 passes through a central opening to the drilled and tapped shaft 15 of the faucet 16 and holds the device in position on said handle. The screw-head is accessible through the open interior of the cup-shaped bracket member 13. The socket 12 has an angular or roughened interior, illustrated in FIGURE 3 as being square in cross-section, for imparting torque to the correspondingly angularly exteriored shaft 15.

As further illustrated in FIGURE 4 in partially exploded cross-section, the device 10 consists of three separate parts, namely the bracket 13, screw 14, and handle 11, the latter being unitary with socket 12. The bracket 13 is provided with protruding locking lugs or segments 17 fitting between spokes 18 of handle 11 to prevent relative rotation of bracket 13 and handle 11 after screw 14 is tightened in place.

In the variation shown in FIGURE 5 the handle 51 has a disc-like central portion 58 in place of spokes 18 as in FIGURES 2 and 3. A socket 52 welded to the center 58 replaces socket 12 of FIGURE 4. An axial threaded extension 54 of the bracket 53 serves as the mounting screw for attaching the device to a faucet shaft. The interior of the bracket 53 is square or polygonal in cross-section for application of a suitable wrench, or may be slotted to receive a screwdriver for attaching to the faucet shaft.

FIGURE 6 illustrates a further variation in which the handle 61, socket 62 and bracket 63 form a unitary device which may be frictionally retained on a shaft 65 fitted with a retractable protruding ball or pin 69 or, if desired, may be affixed to a shaft by means of a central screw as in the previous figures.

What I claim is as follows:

1. A device for providing temporary storage facilities for a garden hose nozzle at the supply faucet, comprising a handle for said faucet and, centrally extending therefrom at the free side thereof, an externally threaded bracket for a nozzle.

2. In combination, a generally wheel-shaped faucet handle having at one flat surface a centrally extending socket for attaching to the rotatable shaft of a water-faucet, and at the opposite flat surface a centrally extending tubular bracket member externally threaded to receive a hose nozzle.

3. As a new combination, a generally wheel-shaped faucet handle having an outer rim, a plurality of radial spokes, and, at the hub area and extending axially to one side of the wheel, a socket member for fitting over the end of a faucet shaft to impart torque thereto for opening and closing said faucet, and a cup-shaped bracket member extending axially from the other side of the wheel, externally threaded to receive a hose nozzle, having at least one segment extending from the base of said cup and between two adjacent spokes of said wheel, said socket and said bracket being axially perforate to receive a mounting screw; and a said screw for holding said bracket and handle together in alignment on an axially bored and correspondingly tapped faucet shaft.

4. A faucet handle comprising a generally wheel-like axially perforate handle member, an axially perforate socket member extending centrally from one side of said handle, and a cup-shaped bracket member extending centrally from the opposite side of said handle, said bracket being externally threaded to receive a hose nozzle, internally shaped to receive a tool for applying torque thereto, and having extending axially outwardly from the base thereof a screw-threaded extension passing through the perforations in said handle and socket members and fitting the correspondingly drilled and tapped shaft of a faucet to maintain said handle and bracket in position thereon.

5. For use in combination with a generally wheel-like faucet handle in providing storage space at the faucet for a threaded hose nozzle, a generally cup-shaped tubular bracket member externally threaded to receive a nozzle, the base being axially perforate for passage of a retaining screw and being provided with axially protruding lugs fitting between adjacent spokes of a said handle to prevent relative rotative movement between said handle and said bracket.

6. A faucet handle member having at one side a socket member for fitting over the end of a faucet shaft to impart torque thereto, and at the opposite side an open cup-shaped bracket member externally threaded to receive a hose nozzle.

References Cited by the Examiner
FOREIGN PATENTS 203,973 6/59 Austria.
801,566 9/58 Great Britain.

CLAUDE A. LE ROY, *Primary Examiner.*